(12) United States Patent
Platz

(10) Patent No.: US 7,435,928 B2
(45) Date of Patent: Oct. 14, 2008

(54) MIRROR

(75) Inventor: Karl Otto Platz, Wiehl-Bomig (DE)

(73) Assignee: Glas Platz GmbH & Co. KG, Wiehl-Bomig (DE)

( * ) Notice: Subject to any disclaimer, the term of this patent is extended or adjusted under 35 U.S.C. 154(b) by 97 days.

(21) Appl. No.: 10/550,931

(22) PCT Filed: Jan. 10, 2004

(86) PCT No.: PCT/EP2004/000119

§ 371 (c)(1),
(2), (4) Date: Jul. 17, 2006

(87) PCT Pub. No.: WO2004/000719

PCT Pub. Date: Oct. 7, 2004

(65) Prior Publication Data

US 2007/0029300 A1 Feb. 8, 2007

(30) Foreign Application Priority Data

Mar. 25, 2003 (DE) ............................... 203 04 873

(51) Int. Cl.
*H05B 3/00* (2006.01)
*H05B 3/16* (2006.01)
(52) U.S. Cl. ...................... 219/219; 219/543

(58) Field of Classification Search ................. 219/213, 219/219, 203, 200, 201, 202, 220, 522, 548; 359/605, 585, 586, 590; 349/161
See application file for complete search history.

(56) References Cited

U.S. PATENT DOCUMENTS

| 3,722,984 A | * | 3/1973 | Brean .......................... 359/605 |
| 5,083,009 A | | 1/1992 | Reiser et al. |
| 5,408,069 A | * | 4/1995 | Mischel, Jr. ................. 219/219 |
| 5,936,696 A | * | 8/1999 | Daijogo et al. .............. 349/161 |
| 6,476,358 B1 | * | 11/2002 | Lang et al. .................. 219/219 |

FOREIGN PATENT DOCUMENTS

| DE | 41 28 735 A1 | 3/1992 |
| EP | 0 999 727 A2 | 5/2000 |
| GB | 2 248 160 A | 3/1992 |

* cited by examiner

*Primary Examiner*—Sang Y Paik
(74) *Attorney, Agent, or Firm*—Diller, Ramik & Wight

(57) ABSTRACT

In a mirror comprising a transparent glass plate provided at least partly with a rear-side reflecting coating as well as at least one integrated electrical means, the first glass plate comprises transparent and/or half-reflecting portions, the first glass plate is bonded to a second glass plate with the aid of a transparent adhesive layer in the form of a laminated glass pane, and electrical cal means are mounted in portions on an electrically conducting coating of the second glass plate facing the transparent and/or half-reflecting portions of the first glass plate.

11 Claims, 1 Drawing Sheet

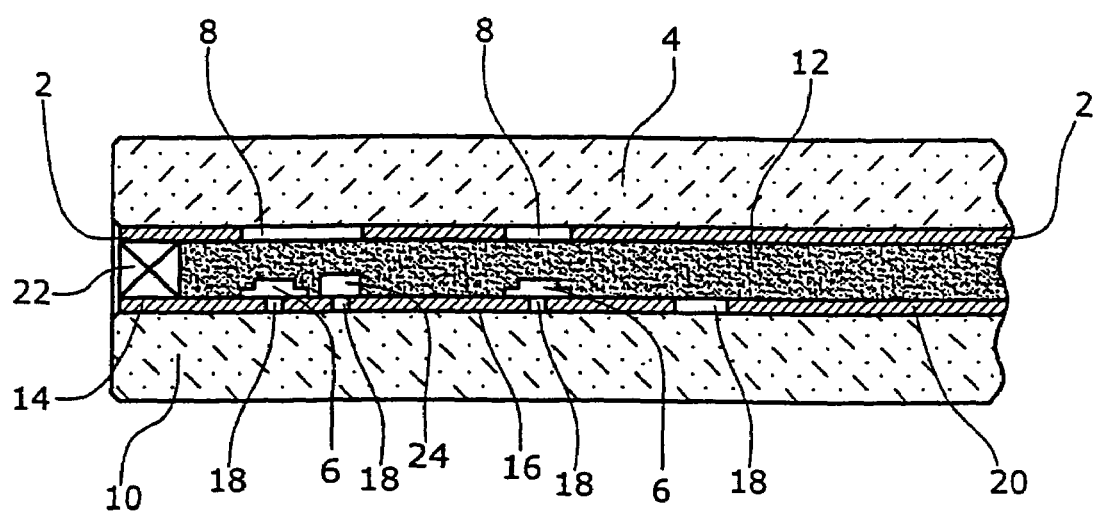

MIRROR

BACKGROUND OF THE INVENTION

The invention relates to a mirror.

Mirrors are known which comprise a reflecting coating causing the reflective effect, the coating being located on the rear side of a transparent glass carrier facing away from the viewer.

It is further known that such mirrors may comprise an integrated electrical means, e.g. an illumination means.

It is an object of the invention to provide a mirror of the aforementioned type which may comprise different electrical functions and is particularly suitable for use in damp locations.

SUMMARY OF THE INVENTION

According to the invention, the first glass plate advantageously comprises transparent and/or half-reflecting portions, wherein said first glass plate is bonded to a second glass plate with the aid of a transparent adhesive layer in the form of a laminated glass pane. Electrical means are mounted on an electrically conducting coating of the second glass plate in portions opposite the transparent and/or half-reflecting portions of the first glass plate. The first glass plate thus comprises transparent or half-reflecting portion configured as window-like recesses, which, in connection with the electrical means, allow the mirror to perform specific functions.

The electrically conducting coating is preferably a pyrolytically applied layer. Such a layer comprises a high degree of roughness such that electrical components comprising electrically conducting adhesives can be firmly coupled with the surface of the electrically conducting and pyrolytically applied coating. The rough structure of the coating further allows high currents to be introduced without the risk of detachment of the electrically conducting coating.

In this manner, it is also possible to operate the electrical means at low voltage since higher currents can be supplied via the electrically conducting coating.

The electrical means are preferably arranged on the side of the second glass plate facing the first glass plate.

The electrical coating is arranged essentially across the entire surface on the side of the second glass plate facing the first glass plate.

The electrical coating may further be configured as a heating surface on a portion of the side of the second glass plate facing the first glass plate.

In the border region between the first and the second glass plate a circumferential seal is arranged which protects the laminated glass pane made up of the two glass plates during regrinding of the mirror edges.

The electrical means comprise, for example, illumination and/or switching and/or display means.

The illumination means may comprise light-emitting diodes, while the switching means may comprise sensors, in particular photo-optical sensors. The switching means may further be configured as a combination of a light-emitting diode and a photocell. Such a combination is, for example, suitable for detection of movements in front of the reflecting surface.

In a particular combination of photocells, the switching means may perform a control function in that the position of a finger is determined such that the finger position can be used like a cursor for controlling an instrument. On the electrically conducting coating the electrical signals are transmitted via conductor paths serving as data lines or signal lines to the edge of the mirror, and from there they can be forwarded to a processing means.

The display means may comprise a flat screen or a light-emitting diode field. In a light-emitting diode field information can be transmitted in the form of ticker. On a flat screen, TV or other video signals can be represented.

The laminated glass mirror made up of the two glass plates and the adhesive layer preferably has a thickness of approximately 8 to 15 mm, preferably approximately 10 to 12 mm. The adhesive layer is, for example, composed of a cast resin layer which embeds the electrical means on the second glass plate.

Hereunder an embodiment of the invention is explained in detail with reference to the single drawing:

BRIEF DESCRIPTION OF THE DRAWING

The single figure of drawing is a fragmentary cross-sectional view and establishes a mirror constructed in accordance with this invention.

DETAILED DESCRIPTION OF THE PREFERRED EMBODIMENTS

The mirror 1 comprises a first transparent glass plate 4 and a second transparent glass plate 10 bonded to each other with the aid of a transparent adhesive layer 12.

The first glass plate 4 is provided with a reflecting film 2 on the side facing away from the viewer, said reflecting film 2 being composed of a reflecting coating causing the reflective effect. The reflecting film 2 comprises recesses at suitable locations to form a transparent portion 8. Alternatively, this portion 8 may be half-reflecting. The recessed portions 8 may, for example, have a size of 30×30 mm.

The second glass plate 10 is provided, on the side facing the first glass plate 4, with an electrically conducting coating 14 which may be divided into a plurality of conductor paths 16, wherein the conductor paths 16 are separated from each other by isolation paths 18. At the outermost edge of the mirror 1 configured as a laminated glass pane, a circumferential seal 22 is arranged which, in particular when the mirror edges are reground, is destined to prevent the mirror or the adhesive layer 12 from being damaged. At the same time, the seal 22 offers special tightness to prevent the penetration of moisture.

The electrically conducting coating 14 is a pyrolytically applied layer with a rough surface on which, for example, light-emitting diodes 6 are coupled with the aid of electrically conducting adhesive. The electrically conducting adhesive allows permanent electrical contacting and at the same time fixes the component, e.g. the light-emitting diode.

The light-emitting diode is arranged at a location of the second glass plate 10 opposite a transparent or half-reflecting portion 8 such that the light-emitting diode 6 serves as an illumination means.

In a half-reflecting portion 8, the light-emitting diode is not visible when switched off.

The illustrated embodiment further comprises a combination of a light-emitting diode 6 and a photocell 24, both being arranged opposite a transparent portion 8.

For example, the light-emitting diode 6 together with a photocell 24 may form a switching means. It shall be understood that other sensor means may be arranged on the electrically conducting layer 14 of the second glass plate 10.

The electrically conducting coating 14 may further be used as a heating surface 20 since due to the resistance properties the electrically conducting coating is adapted to be heated upon introduction of current. This allows the mirror 1 to be prevented from misting over.

The described mirror may thus be a laminated glass mirror with an integrated cable-free illumination means and/or switching or sensor means and/or panel heating, wherein the mirror is particularly suitable for damp locations. Further, the mirror can be integrated into shower cubicles, e.g. in the form of a side wall.

The mirror 1 is cable-free with regard to the internal interconnection of the electrical components. It shall be understood that for the purpose of current supply or transmission of data and/or signals, cables may be connected to the edge or the rear side of the mirror 1.

Although a preferred embodiment of the invention has been specifically illustrated and described herein, it is to be understood that minor variations may be made in the apparatus without departing from the spirit and scope of the invention, as defined by the appended claims.

What is claimed is:

1. A mirror (1) comprising a first transparent glass plate (4) having a viewing side and an opposite rear side, said first transparent glass plate (4) being at least partly provided on the rear side thereof with a reflecting coating (2) and at least one integrated electrical means (6), the first glass plate (4) including at least one of transparent and half-reflecting portions (8) on said rear side, the first glass plate (4) being bonded to a second glass plate (10) by a transparent adhesive layer (12) in the form of a laminated glass pane, said electrical means (6) being mounted on an electrically conducting coating (14) located on a surface of the second glass plate (10) facing the first glass plate (4) and in positions opposite the at least one of transparent and half-reflecting portions (8) of the first glass plate (4), the electrically conducting coating (14) being divided into a plurality of conductor paths (16) which are separated from each other by isolation paths (18), and the electrical means (6) being at least partially embedded in the transparent adhesive layer (12).

2. The mirror as defined in claim 1 wherein the electrically conducting coating (14) is a pyrolytically applied layer.

3. The mirror as defined in claim 1 wherein the electrically conducting coating (14) is arranged substantially across the overall surface on the side of the second glass plate (10) facing the first glass plate (4).

4. The mirror as defined in claim 1 wherein the electrically conducting coating (14) is configured at least on part of the surface of the second glass plate (10) as a heating surface (20).

5. The mirror as defined in claim 1 wherein a border region between the first and second glass plates (4, 10) is sealed by a circumferential seal (22).

6. The mirror as defined in claim 1 wherein the electrical means (6) includes one of illuminating, switching and displaying means.

7. The mirror as defined in claim 6 wherein the illuminating means is a light-emitting diode (6).

8. The mirror as defined in claim 6 wherein the switching means is a photo cell (24).

9. The mirror as defined in claim 6 wherein the displaying means is one of at least a flat screen and a light-emitting diode field.

10. The mirror defined in claim 1 wherein the two glass plates (4, 10) and the adhesive layer (12) collectively define a thickness of the mirror substantially 8 to 15 mm.

11. The mirror defined in claim 1 wherein the two glass plates (4, 10) and the adhesive layer (12) collectively define a thickness of the mirror substantially 10 to 12 mm.

* * * * *